United States Patent [19]

Lehner et al.

[11] 4,310,565

[45] Jan. 12, 1982

[54] PROCESS OF MAKING A MAGNETIC RECORDING MEDIA

[75] Inventors: August Lehner, Roedersheim-Gronau; Heinrich Hartmann, Limburgerhof; Rudolf Bachmann, Frankenthal; Albert Kohl, Weisenheim; Herbert Spoor, Limburgerhof; Karl Mahler, Kehl; Werner Balz, Limburgerhof, all of Fed. Rep. of Germany

[73] Assignee: BASF Aktiengesellschaft, Fed. Rep. of Germany

[21] Appl. No.: 150,181

[22] Filed: May 15, 1980

[30] Foreign Application Priority Data

May 19, 1979 [DE] Fed. Rep. of Germany ....... 2920334

[51] Int. Cl.$^3$ .............................................. B05D 5/12
[52] U.S. Cl. ..................................... 427/48; 427/128; 427/130
[58] Field of Search ............................... 427/127–132, 427/48; 428/900

[56] References Cited

FOREIGN PATENT DOCUMENTS 116693 5/1975 Fed. Rep. of Germany .

OTHER PUBLICATIONS

Angew Chem. /82 JA 1970 /Nr. 2.

Primary Examiner—Bernard D. Pianalto
Attorney, Agent, or Firm—Keil & Witherspoon

[57] ABSTRACT

A process for the manufacture of magnetic recording media, comprising a non-magnetic base and, applied thereto, one or more magnetizable layers, consisting of an anisotropic magnetic material finely dispersed in an organic binder, wherein the binder contains at least 40% of an aqueous ionomeric polyurethane dispersion which at 50° C. forms films having a modulus of elasticity of from 50 to 700 N/mm$^2$ and a DIN No. 53,157 pendulum hardness of from 20 to 110 s, the corresponding values of the modulus and hardness at room temperature being more than 3.5 times higher.

8 Claims, No Drawings

PROCESS OF MAKING A MAGNETIC RECORDING MEDIA

The present invention relates to a process for the manufacture of magnetic recording media, comprising a non-magnetic base and, applied thereto, one or more magnetizable layers, consisting of an anisotropic magnetic material finely dispersed in an organic binder, in which process an aqueous ionomeric polyurethane dispersion is employed.

With only a few exceptions, magnetic recording media are used to record and reproduce audio, video and data signals. The ever increasing demands made on these media call for further improvements in their mechanical and electromagnetic properties. For example, the trend toward higher recording densities in the case of the said types of tape makes the production of thinner magnetic coatings necessary. For this reason the packing density of the magnetic material in the magnetic coating and the remanence in the recording direction must be considerably increased, and the distribution of the magnetic material in the coating, and the surface smoothness and thickness uniformity of the magnetic coating must be greatly improved. All these demands which are made on the magnetic coating with respect to freedom from errors and a uniform signal level at high recording densities may be influenced not only by the dispersibility of the magnetic pigment but also to a high degree by the type of binder used. It is particularly important that the binder should wet the pigment well in order to achieve completely uniform distribution of the pigment therein, exhibit a good flow behavior on the tape base, which is essential for the obtention of a smooth surface, and be completely free from particles which, because of their higher molecular weight, cannot be completely dissolved but are only swollen to a greater or lesser extent by the solvent.

To manufacture such magnetic recording media, the coatings containing the magnetic material have hitherto been produced in the main with the aid of a highly polymeric binder or binder mixture which contains a solvent and is physically drying or chemically crosslinkable. Examples of the solvents employed are methyl ethyl ketone, methyl isobutyl ketone, ethyl acetate, butyl acetate, methanol, ethanol, propanol, butonal, toluene, xylene, tetrahydrofuran and dioxane. Disadvantages of these are that they pollute the environment, constitute a fire hazard, are toxic and are relatively expensive. For these reasons, it has for a long time been considered necessary to carry out the process in a closed system and install a recovery unit and recycle the solvent.

It has therefore already been proposed to employ aqueous polymer dispersions in the manufacture of the magnetic dispersions suitable for the manufacture of magnetic recording media. For example, German LaidOpen Applications DOS NO. 2,513,421 and DOS NO. 2,513,422 describe aqueous polymer dispersions based on crosslinkable vinyl acetate polymers or acrylate polymers and a melamine/formaldehyde resin. The assistants required to produce these dispersions, such as protective colloids, thickeners or emulsifiers, however cause foaming when the dispersions of the magnetic materials are produced, and give magnetic coatings having an increased tendency to smear.

East German Pat. No. 116,693 discloses magnetic recording media in which the magnetic coatings are produced with aqueous dispersions of polymer particles on which the sign of the electrical charge is different from that of the magnetic materials. This patent proposes the use of plasticized polymer dispersions in order to give fold-resistant magnetic coatings which adhere well to the base; examples of polymers used in such dispersions are plasticized polyacrylates, copolymers of vinyl acetate with unsaturated organic acids, copolymers of vinyl chloride and vinylidene chloride, copolymers of styrene and butadiene, copolymers of acrylic esters and styrene, and polyurethanes. The particle size of the polymer dispersions should not be greater, and should advantageously be less, than that of the magnetic pigments. However, magnetic recording media produced with such binders are moisture-sensitive, tend to block and smear, and have an insufficiently wear-resistant magnetic coating.

The use of crosslinked cationic polyurethanes for coating leather and textiles, and also for the production of magnetic coatings, is proposed in East German Pat. No. 116,248. These polyurethanes are produced by reaction of polyurea-urethane electrolyte dispersions (which have been produced by reaction of aromatic and/or aliphatic diisocyanates with relatively long-chain diols to give NCO-terminal prepolymers, subsequent chain extension with diols containing tertiary nitrogen, further reaction with urea and protonizing or quaternizing agents, and subsequent dispersion in water) with methylol-ether compounds. A disadvantage of this method is that crosslinking of the urea groups by means of N-methylol ethers is necessary. In particular, however, the pH-sensitivity of the binder dispersion causes difficulties. Thus it would be necessary, when dispersing the magnetic materials, which have an acid or basic surface, first to match the materials to the pH of the binder. Since even slight differences in the pH would cause the polyurethane to start to crosslink or to coagulate partially, difficulties would arise in the further processing of the magnetic dispersion, and the quality of the magnetic recording media would be impaired because the number of flaws would be increased.

It is an object of the present invention, on the basis of the known advantages of aqueous polymer dispersions, to produce with such binders magnetic recording media which do not have the above-described disadvantages, ie. which are not moisture-sensitive, do not block, are highly abrasion-resistant, and exhibit a low number of flaws.

We have found that this object is achieved and that coated magnetic recording media can be produced by dispersing a finely divided magnetic anisotropic material in a binder which contains at least 40% of an aqueous ionomeric polyurethane dispersion, applying the dispersion to a non-magnetic base, orienting the magnetic anisotropic material and drying the applied coating, if the aqueous ionomeric polyurethane dispersion at 50° C. forms films which have a modulus of elasticity of from 50 to 700 N/mm$^2$ and a DIN 53,157 pendulum hardness of from 20 to 110 s, the corresponding values of the modulus and hardness at room temperature being not more than 3.5 times higher.

In particular, it has proved advantageous to produce the magnetic recording media with aqueous ionomeric polyurethane dispersions which form films having a modulus of elasticity which is greater than 100 N/mm$^2$, in particular greater than 120 N/mm$^2$, and less than 650 N/mm$^2$, in particular less than 600 N/mm$^2$, and have a DIN No. 53,157 pendulum hardness which is greater than 25 s, in particular greater than 30 s, and less than 110 s, each of these properties being measured at 50° C., the corresponding values of the modulus and hardness at room temperature being not more than 2.5 times higher, in particular not more than 1.6 times higher.

In order to obtain fold-resistant magnetic coatings and good adhesion of the coating to the base when using the above polyurethane dispersions, it has proved advantageous to employ dispersions of polymers whose films, at room temperature (23° C.), have a tensile strength greater than 25 N/mm$^2$ and an elongation at break of not less than 50%, advantageously not less than 100%, and which have a pendulum hardness not exceeding 150 s and a modulus of elasticity not exceeding 1,000 N/mm$^2$.

Amongst the aqueous ionomeric polyurethane dispersions which may be employed in the process according to the invention, it is advantageous to employ anionic dispersions in which the counter-ion is formed from ammonia or a volatile amine at a pH of from 6 to 10. This results in increased water resistance of the coating, due to at least partial volatilization of the ammonia or amine when drying the magnetic coating.

In developing the novel process we have found that the desired properties can also be achieved with ionomeric polyurethane dispersions in which the polyurethane ionomer is combined with other, non-ionomeric, polymers, for example polyvinylidene chloride, vinyl chloride/acrylonitrile copolymers, polyvinylformal, polyurethanes free from ionic groups, and epoxy resins or with diisocyanates and/or polyisocyanates. It has proved advantageous to add the other polymer to the polyurethane ionomer (which may for example be dissolved in acetone), then to introduce the water and distil off the organic solvent. This avoids the use of a dispersant which would otherwise be necessary to produce the binder dispersion. Furthermore we have found, surprisingly, that the ionomeric polyurethane dispersions produced in this manner improve the mechanical properties, such as the modulus of elasticity and pendulum hardness, of the binder film, do not foam when the magnetic dispersion is prepared, and have a favorable effect on the wear and frictional properties of the magnetic coatings produced from the magnetic dispersion. It is advantageous to employ dispersions which consist of from 25 to 95, preferably from 40 to 95, parts by weight of polyurethane ionomers and from 5 to 75, preferably from 5 to 60, parts by weight of non-ionomeric polymers. Mixtures of from 60 to 95 parts by weight of the former and from 5 to 40 parts by weight of the latter are particularly advantageous.

Further, we have found that it is advantageous if the polyurethane ionomer employed according to the invention has the same sign of electric charge as the magnetic material to be incorporated into the binder, since there is otherwise a risk that the binder may coagulate.

Suitable starting materials for the preparation of the polyurethane ionomers employed according to the invention are compounds which contain several reactive hydrogen atoms, are substantially linear and have a molecular weight of from 300 to 10,000, preferably from 500 to 4,000. These compounds have terminal hydroxyl, carboxyl, amino or mercapto groups; polyhydroxy compounds with terminal hydroxyl groups, such as polyesters, polyacetals, polyethers, polythioethers, nylons, epoxides and polyester-amides, are preferred. Specific examples of polyethers are the polymerization products of ethylene oxide, propylene oxide, tetrahydrofuran and butylene oxide, the copolymers and graft copolymers of these compounds, the products obtained by condensation of polyhydric alcohols or of mixtures of these, and the products obtained by oxyalkylation of polyhydric alcohols, amines, polyamines or aminoalcohols. Examples of suitable polyacetals are the compounds prepared from hexanediol and formaldehyde. Amongst polythioethers, the condensation products obtained from thiodiglycol or from a mixture thereof with other glycols or polyhydroxy compounds, are particularly suitable.

Polyhydroxy compounds which already contain urethane or urea groups, and modified or unmodified natural polyhydroxy compounds, eg. castor oil and carbohydrates, may also be used. Of course, mixtures of different polyhydroxy compounds may be employed, in order to vary the hydrophilic or hydrophobic character and the mechanical properties of the products.

Suitable polyisocyanates include all aromatic or aliphatic diisocyanates, eg. 1,5-naphthylene diisocyanate, 4,4'-diphenylmethane diisocyanate, 4,4'-diphenyldimethane diisocyanate, dialkyl- and tetraalkyl-diphenylmethane diisocyanates, 4,4'-dibenzyl diisocyanate, 1,3-phenylene diisocyanate, the isomers of toluylene diisocyanate, used individually or as mixtures, chlorinated and brominated diisocyanates, phosphorus-containing diisocyanates, butane-1,4-diisocyanate, hexane-1,6-diisocyanate, dicyclohexylmethane diisocyanate and cyclohexane-1,4-diisocyanate. Partially blocked polyisocyanates which allow the formation of self-crosslinking polyurethanes are particularly suitable; examples of these are dimeric toluylene diisocyanate or polyisocyanates which have been partially reacted with, for example, phenol, tert.-butanol, phthalimide or caprolactam.

Chain extenders containing reactive hydrogen atoms include:

1. The conventional saturated or unsaturated glycols, eg. ethylene glycol or condensates of ethylene glycol, butanediol, propane-1,2-diol, propane-1,3-diol, neopentyl glycol, dihydroxyethoxyhydroquinone, butenediol, mono and bis-hydroxyalkylated aliphatic, cycloaliphatic, aromatic and heterocyclic amines, for example N-methyldiethanolamine, N-butyldiethanolamine, N,N-bis-α-aminopropyl-N-methylamine, N-oleyldiethanolamine, N-cyclohexyldiisopropylamine, N,N-dihydroxyethyl-p-toluidine, N,N-dihydroxypropyl-naphthylamine, polyoxyethylated N-butyldiethanolamine and polyoxypropylated N-methyldiethanolamine (molecular weight 300–4,000), polyesters with tertiary amino groups and dimethyl-bis-hydroxyethyl-hydrazine.

2. Aliphatic, cycloaliphatic and aromatic diamines, eg. ethylenediamine, hexamethylenediamine, 1,4-cyclohexylenediamine, benzidine, diaminodiphenylmethane, the isomers of phenylenediamine, hydrazine or simply ammonia.

3. Aminoalcohols, eg. ethanolamine, propanolamine and butanolamine.

4. Aliphatic, cycloaliphatic, aromatic and heterocyclic dicarboxylic acids, eg. oxalic acid, malonic acid, succinic acid, glutaric acid, adipic acid, pimelic acid, suberic acid, azelaic acid, the isomeric phthalic acids, diphenic acid, the isomeric naphthalic acids, maleic acid, fumaric acid, sulfodiacetic acid, diglycolic acid, thiodiglycolic acid, methylenebis-thioglycolic acid, the isomeric pyridinedicarboxylic acids and the isomeric quinolinedicarboxylic acids.

5. Aliphatic, cycloaliphatic, aromatic and heterocyclic aminocarboxylic acids, eg. glycine, α- and β-alanine, 6-aminocaproic acid, 4-aminobutyric acid, the isomeric aminobenzoic acids and the isomeric aminonaphthoic acids.

6. Water.

7. Chain extenders of higher functionality which are employed in combination with the other chain extenders, for example diethylenetriamine, triethylenetetramine, triethylenepentamine, pentaethylenehexamine, hexaethylenepentamine, glycerol, erythritol, mesoerythritol, arabitol, adonitol, xylitol, sorbitol, dulcitol, 1,3-diaminoisopropanol, 1,2-diaminopropanol, tris-hydroxymethylaminomethane, 2-amino-2-methyl-propane-1,3-diol, 2-amino-2-ethyl-propane-1,5-diol, 2-amino-propane-1,3-diol and the mono-hydroxyalkylated polyamines, eg. N-hydroxyethylethylenediamine, N-hydroxy-ethylhydrazine and N-hydroxyethylhexamethylenediamine.

The polyurethane composition is prepared in a conventional manner, in the presence or absence of a solvent (German Pat. Nos. 1,237,306 and 1,495,745, and German Published Application DAS No. 1,495,847). In general, a pre-adduct is first prepared from the relatively high molecular weight polyhydroxy compound and the polyisocyanate, in the presence or absence of a solvent, at from about 50 to 150° C., and is then reacted further, in the presence or absence of a solvent, with any chain extender used, at from 30° C. to 150° C. It is also possible to mix the polyhydroxy compound and the chain extender before reaction with the polyisocyanate. Furthermore, the reaction can be carried out in the presence of a catalyst, such as a tertiary amine and/or an organo-metallic compound.

In these polyurethane compositions, the groups capable of forming a salt are then converted thereto by the addition of a base. For example, polyurethanes which possess tertiary nitrogen groups in the molecule are converted to the salt form by, for example, adding an acid. Suitable salt-forming agents for the salt-forming groups include:

1. Inorganic and organic bases, such as:
   (a) monofunctional primary, secondary and tertiary amines, eg. methylamine, diethylamine, triethylamine, trimethylamine, dimethylamine, ethylamine, tributylamine, pyridine, aniline and toluidine, hydroxyalkylated amines eg. ethanolamine, diethanolamine, triethanolamine, methyldiethanolamine and oleyldiethanolamine, and polyfunctional polyamines in which the individual amino groups may or may not possess different basicities, for example the polyamines obtained by hydrogeneration of adducts of acrylonitrile with primary or secondary amines, completely or partially alkylated polyamines, eg. N,N-dimethylethylenediamine, and compounds such as α-aminopyridine and N,N-dimethylhydrazine; amines which boil below 120° C. have proved particularly suitable.
   (b) inorganic compounds, eg. ammonia and monovalent metal hydroxides, carbonates and oxides eg. sodium hydroxide, potassium hydroxide, sodium carbonate, potassium carbonate and sodium bicarbonate.

2. Inorganic and organic acids, and compounds containing reactive halogen atoms, eg. hydrochloric acid, nitric acid, amidosulfonic acid, formic acid, acetic acid, glycolic acid and butyl bromide.

In the combinations of the polyurethane ionomers with other compounds, already referred to and particularly advantageous when used in the process according to the invention, the other compounds may be, for example:

1. Polyurethane elastomers devoid of ionic groups, for example those described in German Laid-Open Application DOS No. 2,443,763 or in German Pat. No. 1,106,956.

2. Polymers and/or copolymers of vinyl monomers, eg. of acrylic esters, methacrylic esters, unsaturated organic acids, vinyl acetate, vinyl chloride, vinylidene chloride and styrene.

3. Condensation products, for example polyvinylformals, phenoxy resins, epoxy resins, polyester resins and silicone resins.

4. Diisocyanates, eg. toluylene diisocyanate, diphenylmethane diisocyanate and hexamethylene diisocyanate, and/or polyisocyanates, as described, for example, in German Pat. Nos. 1,090,196, 1,101,394 and 1,222,067.

In selecting the solvent, care must be taken not to carry out the preparation of the polyurethane composition in the presence of a solvent which possesses functional groups which can interact with isocyanate groups under the reaction conditions. In the process according to the invention, it is possible to employ any solvent which does not react with the polyurethane composition, with the cyclic alkylating or acetylating agents used, with the compounds used as quaternizing agents or salt-forming agents, and with the polymers employed in combination with the polyurethane.

Preferred solvents include hydrocarbons, halohydrocarbons, ketones, esters and nitriles, eg. acetone, methyl ethyl ketone, tert.-butanol, tetrahydrofuran, acetonitrile, ethyl acetate, methylene chloride, chloroform, carbon tetrachloride, dimethylformamide and dimethylsulfoxide.

Other suitable polyurethane ionomers can also be prepared by such methods as those described in Angew. Chem. 82 (1970), No. 2, 53–90.

If the polyurethane ionomers mentioned, or the polymers chosen for use in combination therewith, are produced in the absence of a solvent, they must, for further processing, be dissolved in one of the above solvents.

The processing of the aqueous ionomeric polyurethane dispersions with the magnetic material and with the conventional assistants into a magnetic dispersion, and the application thereof to the base material to produce magnetic recording media may be carried out in a conventional manner.

The magnetic pigments used may be conventional products, but of course the choice of pigment is a factor determining the properties of the resulting magnetic coatings. Examples of suitable magnetic pigments include gamma-iron(III) oxide, finely divided magnetite, ferromagnetic modified or unmodified chromium dioxide, cobalt-modified gamma-iron(III) oxide, and ferromagnetic metals and metal alloy pigments, eg. pigments consisting of alloys of iron and cobalt (prepared, for example, as described in German Pat. 1,247,026). Preferred magnetic pigments are acicular gamma-iron(III) oxide and ferromagnetic chromium dioxide. The particle size is in general from 0.2 to 2 μm, preferably from 0.3 to 0.8 μm.

As is conventionally the case, the magnetic coatings may furthermore contain small amounts of additives such as dispersants and/or lubricants, but also fillers which are admixed when dispersing the magnetic pigments or when producing the magnetic coating. Examples of such additives are fatty acids and isomerized fatty acids, eg. stearic acid, or salts of such acids with metals of main groups I to IV of the periodic table of the elements, amphoteric electrolytes, eg. lecithin, fatty acid esters, waxes, silicone oils, carbon black, etc. The additives are used in conventional amounts, which are in general less than 10% by weight, based on the magnetic coating.

The weight ratio of magnetic pigment to binder or binder mixture in the recording media to the invention is in general from 1 to 10:1 and especially from 3 to 6:1. It is particularly advantageous that, because of the excellent pigment-binding power of the polyurethane ionomers, high loadings of magnetic pigment can be achieved in the magnetic coatings without their mechanical properties being impaired and their service characteristics suffering appreciably.

The non-magnetic and non-magnetizable bases used are the conventional rigid or flexible bases, especially films of linear polyesters, eg. polyethylene terephthalate, which are in general from 4 to 200 $\mu m$, especially from 10 to 36 $\mu m$, thick. More recently, the use of magnetic coatings on paper bases has become important for electronic computing and accounting machines; the novel coating materials may be used with advantage for this purpose, too.

The magnetic recording media may be manufactured in a conventional manner. The magnetic dispersion, prepared in dispersing apparatus, for example a steel ball mill or a stirred ball mill, from the magnetic pigment and the polyurethane, with the addition of dispersants and other adjuvants, is advantageously filtered and applied to the non-magnetic base by means of conventional coating equipment, for example a knife coater. As a rule, orientation of the magnetic particles is effected before the fluid mix has dried on the base; drying is advantageously carried out at from 80° to 120° C. for from 2 to 5 minutes.

The magnetic coatings may be subjected to a conventional surface treatment, e.g. calendering in which the coated material is passed between polished rolls, with the application of pressure and optional heating at from 50° to 100° C., preferably from 60° to 80° C. Following this treatment, the thickness of the magnetic coating is in general from 3 to 20 $\mu m$, preferably from 4 to 10 $\mu m$. In the case of the production of flexible magnetic tapes, the coated webs are slit lengthwise to the conventional widths.

The magnetic recording media produced according to the invention have, as compared with recording media produced with conventional aqueous binders, a magnetic coating exhibiting improved homogeneity, as a result of which the number of flaws is appreciably reduced. In addition, the magnetic recording media produced according to the invention have improved wear resistance and reduced sensitivity to moisture. Furthermore, these advantages are achieved with a binder system in which the known disadvantages and hazards resulting from the use of organic solvents are avoided. Further advantages of the novel process are the reduced time required for dispersing the magnetic material in the polyurethane ionomer, and the ability to use the magnetic material in the moist state from its process of manufacture.

The Examples which follow illustrate the novel process; the Comparative Experiments serve to show the advance in the art achieved by the process of the present invention. For greater ease of comparison, the magnetic recording media are produced in the same manner, though the process can, where necessary, be varied by making conventional changes therein.

EXAMPLE 1

23.4 parts of aminoethylethanolamine, dissolved in tetrahydrofuran, are added to an isocyanate prepolymer produced from 166 of hexanediol polycarbonate having a molecular weight of 2,000, 4.5 parts of butane-1,4-diol and 98 parts of dicyclohexylmethane diisocyanate in tetrahydrofuran as the solvent. After a reaction time of one hour at 60° C., 11.2 parts of succinic anhydride are added. The reaction is complete after 4 hours at 65° C., and the reaction product is then neutralized with 11.2 parts of triethanolamine. Subsequent addition of 69 parts of an adduct of 3 moles of toluylene diisocyanate, 0.75 mole of trimethylolpropane and 0.375 mole of butane-1,3-diol, in the form of a 75% strength solution in ethyl acetate, and 70 parts of water, to 30 parts of polyurethane ionomer dissolved in tetrahydrofuran, followed by distilling off the tetrahydrofuran, which gives a stable aqueous polyurethane dispersion. The modules of elasticity, and the pendulum hardness, are determined, at 50° C. and 23° C., on films produced from the dispersion. The results are shown in the Table.

6,000 parts of an acicular gamma-iron(III) oxide, having a coercive force of 24.3 kA/m, are then dispersed for 10 hours in a solution of 240 parts of 30% strength ammonium polyacrylate, 100 parts of 10% strength ammonia and 3,900 parts of water in a steel ball mill which has a capacity of 30,000 parts by volume, is filled with 40,000 parts of balls and is run at 50 rpm. 3,750 parts of the polyurethane dispersion prepared above and 60 parts of a commercial silicone oil are then added to the batch and dispersing is continued for 30 minutes.

The resulting magnetic dispersion is filtered through a filter paper of 5 $\mu m$ pore size and is then applied to a 12 $\mu m$ thick polyethylene terephthalate film by means of a conventional knife coater. The coated film is passed through a uniform magnetic field to orient the gamma-iron (III) oxide particles and the coating is then dried at 80°–120° C. Thereafter, the coated film is calendered at 80° C. and a nip pressure of 23 N/mm$^2$. The magnetic coating is 5.0±0.3 $\mu m$ thick. The coated film is then slit into 3.81 mm wide magnetic tapes, which are subjected to the following tests:

Test 1: Wear in sustained operation

This test is used to assess the wear characteristics of a tape. The abrasion is measured as the weight loss of a tape loop, in mg. The loop is 95 cm long, the tape speed in 4 m/sec, the tape tension is 35 cN, and the tape is run for 1 hour at an ambient temperature of 23° C. and at 50% relative atmospheric humidity.

Test 2: Coefficient of friction, magnetic coating/steel, before and after sustained operation.

The coefficients of friction are determined by the method of DIN No. 45,522, Sheet 1, on virgin tape and on the tape used in Test 1.

Test 3: Friction at very low relative velocity

The coefficient of friction is determined by measuring the tensile force which is produced by the friction between a moving magnetic tape and a stationary drum. The drum is a steel drum having a surface roughness of about 0.15 $\mu m$ and a diameter of 70 mm. The piece of tape is 25 cm long and is drawn, under a tension of 20 cN, over the drum at a speed of 1 mm/sec, the wrap-around angle being 180°. The tensile force exerted on the drum, F, is a measure of the coefficient of friction μ, which is calculated using equation $$\mu = \frac{1}{\pi} \times \ln\frac{F}{20}.$$

Test 4: Dynamic friction

The coefficient of friction is measured by the same method as in Test 3, expect that the drum revolves at a peripheral speed of 9.5 cm/sec.

Test 5: Blocking (layer-to-layer adhesion)

Blocking of the magnetic tapes is measured by the MIL-T-21029A method, which differentiates between blocking and delamination of the coating and base.

The results of the tests are shown in the Table.

EXAMPLE 2

23.4 parts of aminoethylethanolamine, dissolved in acetone, are added to an isocyanate prepolymer prepared from 170 parts of a polyester of adipic acid, butane-1,4-diol and glycol, having a molecular weight of 2,000, 4.5 parts of butane-1,4-diol and 98 parts of dicyclohexylmethane diisocyanate in acetone as the solvent. After a reaction time of ½ hour at 40° C., 11.2 parts of succinic anhydride are added. The reaction is complete after 5 minutes at 40° C., and the reaction product is then neutralized with 11.2 parts of triethanolamine. 69 parts of an adduct of 3 moles of toluylene diisocyanate, 0.75 mole of trimethylolpropane and 0.357 mole of butane-1,3-diol, in the form of a 75% strength solution in ethyl acetate, and 70 parts of water are then added to 30 of polyurethane ionomer dissolved in acetone, and the acetone is distilled off, giving a stable aqueous polyurethane dispersion. A magnetic tape is produced therewith, as described in Example 1. The results of the measurements on the polymer film and the magnetic tape are shown in the Table.

EXAMPLE 3

23.4 parts of aminoethylethanolamine, dissolved in acetone, are added to an isocyanate prepolymer prepared from 170 parts of a polyester of adipic acid, butane-1,4-diol and hexane-1,6-diol, having a molecular weight of 2,000, 4.5 parts of butane-1,4-diol and 98 parts of dicyclohexylmethane diisocyante in acetone as the solvent. After a reaction time of ½ hour at 40° C., 11.2 parts of succinic anhydride are added. The reaction is complete after 5 minutes at 40° C., and the reaction product is then neutralized with 11.2 parts of triethanolamine. 69 parts of an adduct of 3 moles of toluylene diisocyanate, 0.75 mole of trimethylolpropane and 0.375 mole of butane-1,3-diol, in the form of a 75% strength solution in ethyl acetate, and 70 parts of water are then added to 30 parts of polyurethane ionomer dissolved in acetone, and the acetone is distilled off, giving a stable aqueous polyurethane dispersion. A magnetic tape is produced therewith, as described in Example 1. The results of the measurements on the polymer film and the magnetic tape are shown in the Table.

EXAMPLE 4

23.4 part of aminoethylethanolamine, dissolved in acetone, are added to an isocyanate prepolymer prepared from 166 parts of a polycaprolactone having a molecular weight of 830, 4.5 parts of butane-1,4-diol and 128 parts of dicyclohexylmethane diisocyanate in acetone as the solvent.

After a reaction time of ½ hour at 40° C., 11.2 parts of succinic anhydride are added. The reaction is complete after 15 minutes at 40° C., and the reaction product is then neutralized with 11.2 parts of triethanolamine. 69 parts of an adduct of 3 moles of toluylene diisocyanate, 0.75 mole of trimethylolpropane and 0.375 mole of butane-1,3-diol, in the form of a 75% strength solution in ethyl acetate, and 70 parts of water are then added to 30 parts of polyurethane ionomer dissolved in acetone, and the acetone is distilled off, giving a stable aqueous polyurethane dispersion. A magnetic tape is produced therewith, as described in Example 1. The results of the measurements on the polymer film and the magnetic tape are shown in the Table.

EXAMPLE 5

33 parts of aminoethylethanolamine, dissolved in acetone, are added to an isocyanate prepolymer prepared from 232 parts of a polycaprolactone having a molecular weight of 830, 6.3 parts of butane-1,4-diol, 59 parts of dicyclohexylmethane diisocyanate and 115 parts of diphenylmethane diisocyanate in acetone as the solvent. After a reaction time of ½ hour at 40° C., 15.7 parts of succinic anhydride are added. The reaction is complete after 5 minutes at 40° C., and the reaction product is then neutralized with 15.7 parts of triethanolamine. 97 parts of an adduct of 3 moles of toluylene diisocyanate, 0.75 mole of trimethylolpropane and 0.375 mole of butane-1,3-diol, in the form of a 75% strength solution in ethyl acetate, and 150 parts of water are then added to 30 parts of polyurethane ionomer dissolved in acetone, and the acetone is distilled off, giving a stable aqueous polyurethane dispersion. A magnetic tape is produced therewith, as described in Example 1. The results of the measurements on the polymer film and the magnetic tape are shown in the Table.

EXAMPLE 6

23.4 parts of aminoethylethanolamine, dissolved in acetone, are added to an isocyanate prepolymer prepared from 170 parts of a polycaprolactone having a molecular weight of 830, 4.5 parts of butane-1,4-diol, 50 parts of an epoxide which is based on bisphenol A, has an epoxide value of 0.2 g mole of expoxy per 100 g of resin, contains 0.32 g mole of hydroxyl groups per 100 g of resin and has a molecular weight of 900, and 148 parts of dicyclohexylmethane diisocyanate in acetone as the solvent. After a reaction time of 1 hour at 40° C., 11.2 parts of succinic anhydride are added. The reaction is complete after 5 minutes at 40° C., and the reaction product is then neutralized with 11.2 parts of triethanolamine. 150 parts of a 20% strength solution of a nonionic polyurethane in tetrahydrofuran, prepared from 34.1 parts of a polyester-diol of adipic acid and butane-1,4-diol, having a molecular weight of 1,000, 17.5 parts of neopentyl glycol, 0.5 part of trimethylolpropane and 49.7 parts of diphenylmethane diisocyanate, are stirred into 500 parts of the resulting polyurethane ionomer dissolved in acetone. 350 parts of water are then added to the mixture, whilst stirring, and acetone and tetrahydrofuran, as well as part of the water, are distilled off. A magnetic tape is produced with this aqueous polyurethane dispersion by the method described in Example 1. The results of the measurements on the polymer film and the magnetic tape are shown in the Table.

EXAMPLE 7

The procedure described in Example 4 is followed, but without addition of the 69 parts of a 75% strength solution of an adduct of 3 moles of toluylene diisocyanate, 0.75 mole of trimethylolpropane and 0.375 mole of butane-1,3-diol, in ethyl acetate, when preparing the polyurethane dispersion. The results of the measurements on the polymer film and the magnetic tape are shown in the Table.

EXAMPLE 8

166 parts of a polycarbonate having a molecular weight of 2,000, 4.5 parts of butane-1,4-diol and 158 parts of dicyclohexylmethane diisocyanate are dissolved in 328 parts of tert.-butanol and after adding a catalytic amount of dibutyl-tin dilaurate the mixture is stirred at 50° C. until the NCO content is 6%. 23.4 parts of aminoethylethanolamine, dissolved in 324 parts of acetone, are then added and after 30 minutes at 40° C. 22.4 parts of triethylamine and 22.4 parts of succinic anhydride are stirred in. After 5 minutes, 15.5 parts of diethylenetriamine, dissolved in 1,000 parts of water, are added and the solvent is then distilled off under reduced pressure. The resulting polyurethane dispersion is sued to produce a magnetic tape by the method described in Example 1. The results of the measurements on the polymer film and the magnetic tape are shown in the Table.

COMPARATIVE EXPERIMENT 1

23.4 parts of aminoethylethanolamine, dissolved in acetone, are added to an isocyanate prepolymer prepared from 170 parts of a polycaprolactone having a molecular weight of 830, 4.5 parts of butane-1,4-diol, 50 parts of an epoxide which is based on bisphenol A, has an epoxide value of 0.2 g mole of expoxy per 100 g of resin, contains 0.32 g mole of hydroxyl groups per 100 g of resin and has a molecular weight of 900, and 148 parts of dicyclohexylmethane diisocyanate in acetone as the solvent. After a reaction time of 1 hour at 40° C., 11.2 parts of succinic anhydride are added. The reaction is complete after 5 minutes at 40° C. and the reaction product is then neutralized with 11.2 parts of triethanolamine. 73 parts of water are then added to 30 parts of polyurethane ionomer dissolved in acetone, and the acetone is distilled off, giving a stable aqueous polyurethane dispersion. A magnetic tape is produced with this dispersion by the method described in Example 1. The results of the measurements on the polymer film and the magnetic tape are shown in the Table.

COMPARATIVE EXPERIMENT 2

23.4 parts of aminoethylethanolamine, dissolved in acetone, are added to an isocyanate prepolymer prepared from 166 parts of a polycaprolactone having a molecular weight of 830, 4.5 parts of butane-1,4-diol and 128 parts of dicyclohexylmethane diisocyanate in acetone as the solvent. After a reaction time of 1 hour at 50° C., 11.2 parts of succinic anhydride are added. The reaction is complete after 5 minutes at 40° C. and the reaction product is then neutralized with 11.2 parts of triethanolamine. 87 parts of water are then added to 30 parts of polyurethane ionomer dissolved in acetone, and the acetone is distilled off, giving a stable aqueous polyurethane dispersion. A magnetic tape is produced with this dispersion by the method described in Example 1. The results of the measurements on the polymer film and the magnetic tape are shown in the Table.

COMPARATIVE EXPERIMENT 3

A commercial butyl acrylate/styrene copolymer containing small amounts of acrylic acid and acrylamide as copolymerized units, and having the film properties shown in the Table, is used, in place of the aqueous polyurethane dispersion, to produce a magnetic tape by the method of Example 1. The results of the measurements on the tape are shown in the Table.

COMPARATIVE EXPERIMENT 4

A commercial aqueous polyurethane dispersion having the film properties shown in the Table is used, instead of the dispersion prepared in Example 1, to produce a magnetic tape by the method of Example 1. The results of the measurements on the tape are shown in the Table.

COMPARATIVE EXPERIMENT 5

A commercial vinyl acetate/maleic acid copolymer having the film properties shown in the Table is used, instead of the dispersion prepared in Example 1, to produce a magnetic tape by the method of Example 1. The results of the measurements on the tape are shown in the Table.

TABLE

| | Film properties | | | | Properties of the magnetic tape Test No. | | | | |
| | Pendulum hardness | | Modulus of elasticity | | | | | | |
| | 50° C. | 23° C. | 50° C. | 23° C. | 1 | 2 | 3 | 4 | 5 |
| --- | --- | --- | --- | --- | --- | --- | --- | --- | --- |
| Example 1 | 89 | 95 | 184 | 205 | 1.5 | 0.4/0.36 | 0.35 | — | none |
| Example 2 | 80 | 88 | 190 | 215 | 2.9 | — | — | 0.48 | " |
| Example 3 | 83 | 88 | 170 | 217 | 1.8 | 0.4/0.29 | 0.4 | 0.6 | " |
| Example 4 | 38 | 51 | 204 | 240 | 2.7 | — | — | 0.42 | " |
| Example 5 | 38 | 56 | 210 | 249 | 2.5 | 0.32/0.30 | 0.4 | 0.4 | " |
| Example 6 | 44 | 59 | 220 | 260 | 2.4 | 0.42/0.34 | 0.46 | — | " |
| Example 7 | 30 | 38 | 120 | 150 | 3.5 | — | 0.32 | — | " |
| Example 8 | 88 | 90 | 408 | 484 | 1.5 | 0.42/0.35 | 0.32 | 0.55 | " |
| Comparative Experiment 1 | 11 | 13 | <5 | <10 | 3.2 | 1.0/0.8 | sticks | sticks | delamination |
| Comparative Experiment 2 | 16 | 18 | 25 | 55 | 5.6 | 0.62/0.40 | 0.59 | 0.67 | — |
| Comparative Experiment 3 | 2 | 16 | <5 | <10 | sticks | sticks | sticks | sticks | delamination |
| Comparative Experiment 4 | 21 | 81 | 56 | 440 | not measurable | " | not measureable | " | " |
| Comparative Experiment 5 | — | — | — | — | 6.8 | — | — | 0.4 | " |

We claim:

1. A process for the manufacture of magnetic recording media by dispersing a finely divided magnetic anisotropic material in a binder which contains at least 40% of an aqueous ionomeric polyurethane dispersion, applying the dispersion to a non-magnetic base, orienting the magnetic anisotropic material and drying the applied coating, wherein the aqueous ionomeric polyurethane dispersion at 50° C. forms films which have a modulus of elasticity of from 50 to 700 N/mm$^2$ and a DIN No. 53,157 pendulum hardness of from 20 to 110 s, the corresponding values of the modulus and hardness at room temperature being not more than 3.5 times higher.

2. A process for the manufacture of magnetic recording media by dispersing a finely divided magnetic anisotropic material in a binder which contains at least 40% of an aqueous ionomeric polyurethane dispersion, applying the dispersion to a non-magnetic base, orienting the magnetic anisotropic material and drying the applied coating, wherein the aqueous ionomeric polyurethane dispersion at 50° C. forms films having a modulus of elasticity of from 100 to 650 N/mm$^2$ and a DIN No. 53,157 pendulum hardness of from 25 to 110 s, the corresponding values of the modulus and hardness at room temperature being not more than 2.5 times higher.

3. A process for the manufacture of magnetic recording media, by dispersing a finely divided magnetic anisotropic material in a binder which contains at least 40% of an aqueous ionomeric polyurethane dispersion, applying the dispersion to a non-magnetic base, orienting the magnetic anisotropic material and drying the applied coating, wherein the aqueous ionomeric polyurethane dispersion at 50° C. forms films having a modulus of elasticity of from 120 to 600 N/mm$^2$ and a DIN No. 53,157 pendulum hardness of from 30 to 110 s, the corresponding values of the modulus and hardness at room temperature being not more than 1.6 times higher.

4. The process of claim 2 or 3, wherein the aqueous anionic polyurethane dispersion contains ammonia, or an amine of boiling point below 120° C.

5. The process of claim 1 or 2 or 3, wherein the aqueous ionomeric polyurethane dispersion is employed as the sole binder.

6. The process of claim 2, wherein the binder consists of from 40 to 95% of an aqueous ionic polyurethane dispersion and from 5 to 60% of a non-ionic polymer.

7. The process of claim 6, wherein the non-ionic polymer is a thermoplastic polyurethane elastomer.

8. A process as claimed in claim 6, wherein the non-ionic polymer contains from 5 to 30% of a diisocyanate and/or polyisocyanate.

* * * * *